(12) United States Patent
Sakurai (10) Patent No.: US 9,094,598 B2
(45) Date of Patent: Jul. 28, 2015

(54) IMAGE PICKUP APPARATUS AND FOCUSING METHOD WITH FIRST AND SECOND IMAGE PICKUPS ON PRIMARY AND SECONDARY IMAGING PLANES

(75) Inventor: Hiroshi Sakurai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 13/095,000

(22) Filed: Apr. 27, 2011

(65) Prior Publication Data

US 2011/0267532 A1 Nov. 3, 2011

(30) Foreign Application Priority Data

Apr. 30, 2010 (JP) ................................ 2010-105596

(51) Int. Cl.
*H04N 5/232* (2006.01)
*H04N 5/369* (2011.01)

(52) U.S. Cl.
CPC ......... *H04N 5/23212* (2013.01); *H04N 5/3696* (2013.01)

(58) Field of Classification Search
CPC .............. H04N 5/232; H04N 5/23293; H04N 5/23212; H04N 5/23219; H04N 5/3696
USPC ..................... 348/208.12, 346, 345
See application file for complete search history.

(56) References Cited

U.S. PATENT DOCUMENTS

| | | | | |
|---|---|---|---|---|
| 2003/0189662 | A1* | 10/2003 | Matsuda | 348/345 |
| 2006/0165403 | A1* | 7/2006 | Ito | 396/123 |
| 2006/0262659 | A1* | 11/2006 | Kurosawa | 369/1 |
| 2007/0206937 | A1* | 9/2007 | Kusaka | 396/89 |
| 2008/0267601 | A1* | 10/2008 | Kobayashi | 396/91 |
| 2009/0110383 | A1* | 4/2009 | Fujii | 396/128 |
| 2010/0013947 | A1* | 1/2010 | Oikawa | 348/222.1 |
| 2011/0228127 | A1* | 9/2011 | Nakagawa | 348/222.1 |

FOREIGN PATENT DOCUMENTS

| | | |
|---|---|---|
| JP | 2001-128044 | 5/2001 |
| JP | 2001-174690 | 6/2001 |
| JP | 2005-012307 | 1/2005 |
| JP | 2006-146031 A | 6/2006 |
| JP | 2007-233032 A | 9/2007 |
| JP | 2007-316496 A | 12/2007 |
| JP | 2009244429 A * | 10/2009 |
| JP | 2010-008602 A | 1/2010 |

OTHER PUBLICATIONS

Jan. 7, 2014 Japanese Office Action, that issued in Japanese Patent Application No. 2010-105596.

* cited by examiner

*Primary Examiner* — Nicholas Giles
*Assistant Examiner* — Abdelaaziz Tissire
(74) *Attorney, Agent, or Firm* — Cowan, Liebowitz & Latman, P.C.

(57) ABSTRACT

An image pickup apparatus includes an image pickup element that includes a plurality of image pickup pixels and a plurality of focus detecting pixels, a detector configured to detect a phase difference between two images of the object on a secondary imaging plane, and a controller configured to provide focusing based on a defocus amount obtained from a detection result of the detector for a first focus detecting point, and set a correcting value used to correct a defocus amount obtained from a next detection result of the detector so that a difference can reduce between the defocus amount obtained from the detection result of the detector for the first focus detecting point and a defocus amount obtained from the focus detecting pixels for the first focus detecting point of a captured image of the object that has been captured.

7 Claims, 12 Drawing Sheets

IMAGE PICKUP APPARATUS AND FOCUSING METHOD WITH FIRST AND SECOND IMAGE PICKUPS ON PRIMARY AND SECONDARY IMAGING PLANES

BACKGROUND OF THE INVENTION

1. Field of the Invention

The present invention relates to an image pickup apparatus and a focusing method.

2. Description of the Related Art

A phase difference detecting method is known as an autofocusing ("AF") method. Japanese Patent Laid-Open No. ("JP") 2009-244429 proposes an image pickup apparatus that includes an image pickup element that has focus detecting pixels and is configured to provide a phase difference AF on an image pickup plane, and a dedicated sensor that provides a phase difference AF on a secondary imaging plane. Other prior art include JP 2001-174690, 2001-128044, and 2005-12307.

Since focus detecting data from the dedicated sensor represents the just previous state of the image pickup, the focus detecting data generated by the dedicated sensor at the focus detecting time does not correspond to a captured image when an object is a moving body, due to a time lag from the focus detection to image pickup. As a result, the in-focus precision deteriorates. Although there are conventionally demands for the improved in-focus precision in the phase difference AF using the dedicated sensor, none of prior art propose effective means for improving the in-focus precision using the dedicated sensor.

SUMMARY OF THE INVENTION

The present invention provides an image pickup apparatus and focusing method which can improve the in-focus precision using a dedicated sensor.

An image pickup apparatus according to the present invention includes an image pickup element that includes a plurality of image pickup pixels each configured to generate an image of an object by performing a photoelectric conversion for light from an image pickup lens, and a plurality of focus detecting pixels each configured to receive light that passes part of an exit pupil of the image pickup lens, a detector configured to detect a phase difference between two images of the object on a secondary imaging plane, and a controller configured to provide focusing based on a defocus amount obtained from a detection result of the detector for a first focus detecting point, and set a correcting value used to correct a defocus amount obtained from a next detection result of the detector so that a difference can be reduced between the defocus amount obtained from the detection result of the detector for the first focus detecting point and a defocus amount obtained from the focus detecting pixels for the first focus detecting point of a captured image of the object that has been captured.

Further features of the present invention will become apparent from the following description of exemplary embodiments with reference to the attached drawings.

DESCRIPTION OF THE EMBODIMENTS

Figure 1:
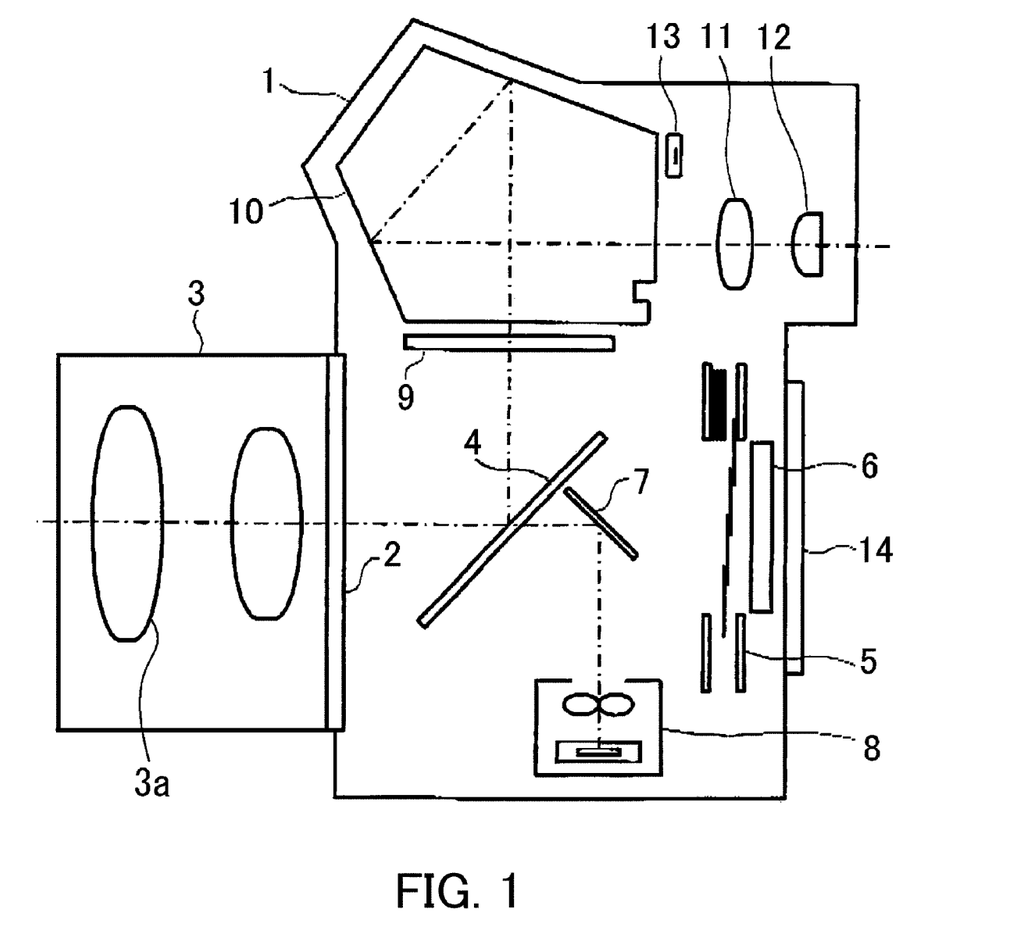
FIG. 1 is a sectional view of a digital single-lens reflex camera of this embodiment.
Figure 2:
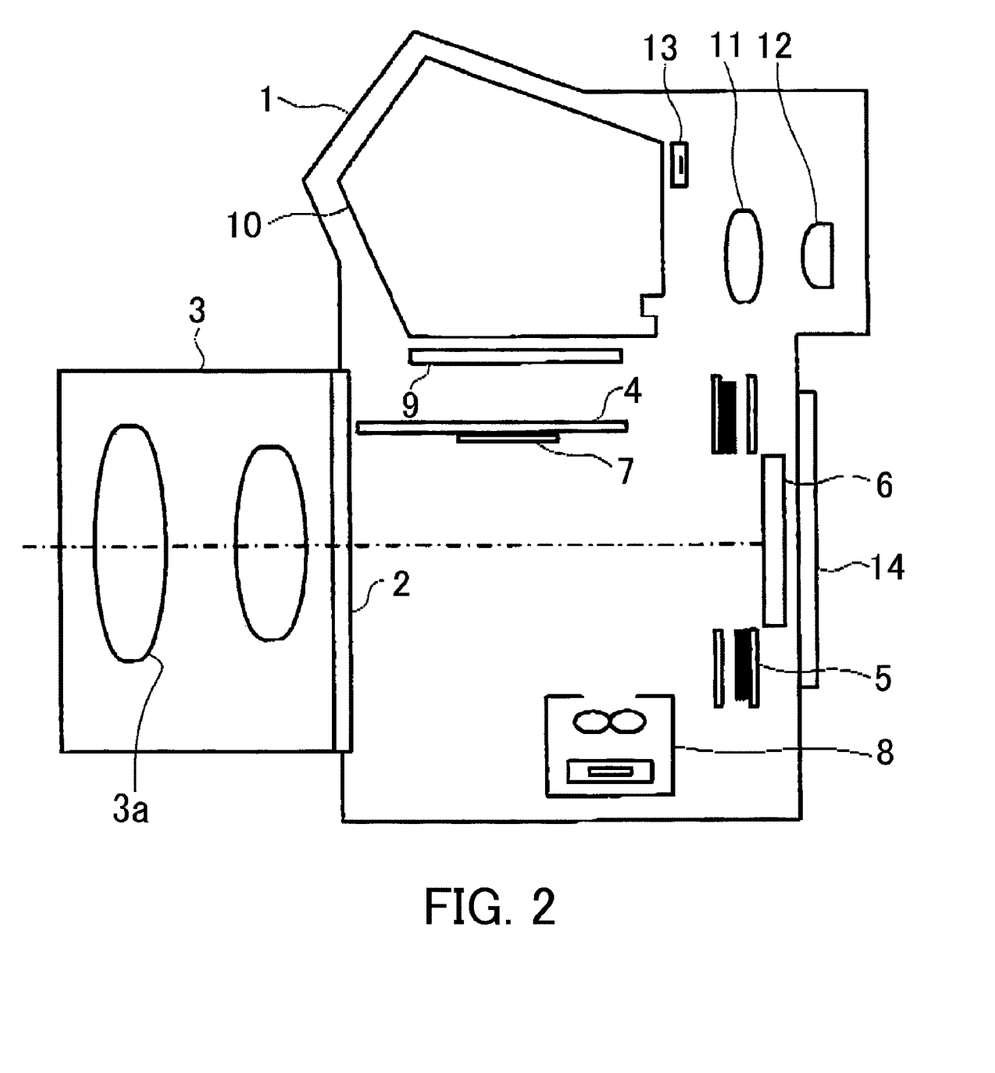
FIG. 2 is a sectional view of the digital single-lens reflex camera in a state different from that illustrated in FIG. 1.

FIGS. 1 and 2 are sectional views of a digital single-lens reflex camera (image pickup apparatus) of this embodiment. The image pickup apparatus of this embodiment is not limited to the digital single-lens reflex camera.

Reference numeral 1 denotes a camera body, reference numeral 2 denotes a mount that enables an image pickup lens 3 to be removably attached to the camera body 1, and includes an interface unit configured to transmit a variety of signals and supply driving power.

Reference numeral 3 denotes an exchangeable image pickup lens, which includes a focus lens unit, a zoom lens unit, and a stop unit (not illustrated). In FIGS. 1 and 2, one lens conveniently represents each lens unit; for example, a focus lens 3a represents the focus lens unit. However, each complicated lens unit actually includes a plurality of lenses. FIGS. 1 and 2 do not intend to limit the focus lens 3a to a front lens of the image pickup lens 3.

Reference numeral 4 is a main mirror including a halfmirror rotatable in accordance with an operational state of the camera. The main mirror 4 is inclined in the image pickup optical path when a viewfinder is used to observe an object, and deflects and guides a light flux from the image pickup lens 3 to a finder optical system, which will be described later (FIG. 1). The main mirror 4 retreats from the image pickup optical system at the image pickup time or the live view time, and allows a light flux from the image pickup lens 3 to enter an image pickup element 6, which will be described later.

Reference numeral 5 denotes a shutter configured to control the incidence of the light flux from the image pickup lens 3 on the image pickup element 6, which will be described later. The shutter 5 is closed usually (FIG. 1), and opened at the image pickup time or at the live view time (FIG. 2).

Reference numeral 6 denotes an image pickup element including a CMOS image sensor and its peripheral circuit. The image pickup element 6 is configured so that all of its pixels can independently output a signal. In addition, parts of the pixels are focus detecting pixels that enable a focus detection of a phase difference detecting method (phase difference AF) on an image pickup plane. More specifically, the image pickup element 6 includes a plurality of image pickup pixels each of which is configured to generate an image of the object when receiving light from the entire region on the exit pupil of the image pickup lens 3 configured to generate an image of the object.

The image pickup lens 6 further includes a plurality of focus detecting pixels each of which is configured to receive light that passes part of the area of the exit pupil of the image pickup lens 3. The plurality of focus detecting pixels as a whole can receive the light that passes the entire region of the exit pupil of the image pickup lens 3.

The image pickup plane phase difference AF is similar to that disclosed in JP 2009-244429, and a detailed description thereof will be omitted. In this embodiment, a block is defined as a square area of 100 pixels including 10 column times 10 rows. A cluster is defined as an area of 2×2=4 blocks. A field is defined as an area of 5×5=25 clusters. A section is defined as an area of 1 block in the lateral direction and 10 blocks in the longitudinal direction, totally 10 blocks.

One focus detecting area includes a plurality of (e.g., 10 in this embodiment) sections in the lateral direction. In other words, one focus detecting area has an area of 100 columns times 100 rows equal to ten thousand pixels in this embodiment, which is the same as one field. One focus detecting area constitutes one focus detecting point.

Reference numeral 7 denotes a sub-mirror configured to rotate with the main mirror 4. The sub-mirror 4 deflects and guides the light flux that has transmitted through the main mirror 4 to an AF sensor 8, which will be described later (FIG. 1) when the main mirror is inclined in the image pickup optical path. The sub-mirror 7 rotates with the main mirror 4 at the image pickup time and at the live view time, and retreats from the image pickup optical path (FIG. 2). The sub-mirror 7 is not a half-mirror, and shields the light from the image pickup element 6.

Reference numeral 8 denotes a dedicated sensor (AF sensor) that serves as a detector, and includes a secondary imaging lens and a plurality of photoelectric conversion elements, like a CCD or CMOS area sensor. The AF sensor 8 is configured to detect a phase difference (or an interval) between two images of the object on the secondary imaging plane and to detect a phase difference. The AF sensor 8 outputs a potential change of the object image formed on the photoelectric conversion element; the MPU 20 obtains a defocus amount based on the output and provides the AF.

Reference numeral 9 denotes a focus plate arranged on a primary imaging surface of the image pickup lens 3, which includes a Fresnel lens (condenser lens) on an incidence plane and forms an object image (finder image) on an exit plane. Reference numeral 10 denotes a pentaprism used to deflect a finder optical path, and correct an object image formed on the exit plane of the focus plate 9 into an erect image. Reference numerals 11, 12 denote eyepieces. The finder optical system is an optical system that includes the focus plate 9, the pentaprism 10, and the eyepieces 11, 12.

Reference numeral 13 denotes an automatic exposure ("AE") sensor, which includes photodiodes each corresponding to each of multi-divided image pickup areas, and is configured to measure the brightness of the object image formed on the exit plane of the focus plate 9.

Reference numeral 14 denotes a liquid crystal monitor (display unit) configured to display a captured image and a variety of types of image pickup information. The liquid crystal monitor 14 displays an image of the object captured by the image pickup element 6 at the live view mode time, and AF frames which can be settable and has been set by a MC 33 that serves as an AF frame setting unit, which will be described later.

Figure 3:
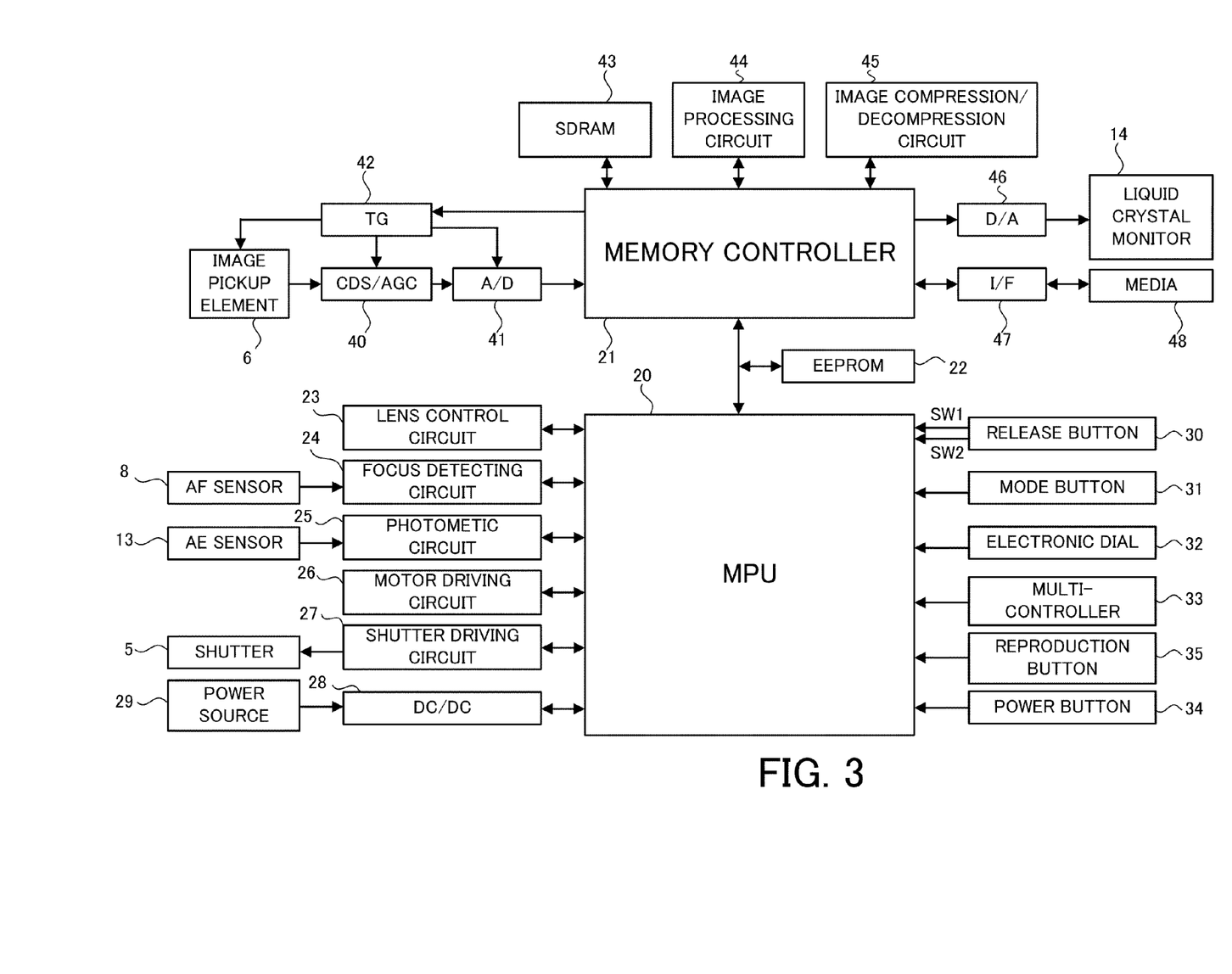
FIG. 3 is a block diagram of a control system of the digital single-lens reflex camera illustrated in FIG. 1.

FIG. 3 is a block diagram of a control system of the digital single-lens reflex camera.

Reference numeral 20 is a microprocessor (referred to as a "MPU" hereinafter) configured to control the camera body and the entire camera.

The MPU (controller) 20 provides focusing based on a (first) defocus amount of a focus detecting point obtained by the AF sensor 8 as the detector. The AF frame is set by the MC 33 as the frame setting unit, as described later.

The MPU 20 also calculates a (second) defocus amount of an AF frame by performing the phase difference AF and by calculating output signals for the focus detecting pixels of the AF frame. The MPU 20 sets a correcting value for correcting a defocus amount obtained from a next detection result of the AF sensor based on a difference between the first defocus amount and the second defocus amount or provides a warning display.

Reference numeral 21 denotes a memory controller configured to provide a variety of types of controls of image data. Reference numeral 22 denotes an EEPROM configured to store settings for a variety of types of controls and adjustment data, etc., and the settings for the variety of types of controls includes a setting of a correcting value used for focusing, which will be described later. The SDRAM 43, which will be described later, may store the setting of the correction value used for focusing, which will be described later.

Reference numeral 23 denotes a lens control circuit for the lenses in the image pickup lens 3, which is connected to the MPU 20 through the mount 2 and provides focusing (in-focus driving) of the focus lens 3a and drives the stop unit based on information, which will be described later.

Reference numeral 24 denotes a focus detecting circuit configured to control the accumulation and readout of the area sensor of the AF sensor 8, and to output to the MPU 20 pixel information of each focus detecting point (or each focus detecting area frame). The MPU 20 performs a known phase difference AF for the pixel information of each focus detecting point, sends the detected focus information to the lens control circuit 23, and provides focusing of the focus lens 3a. A series of this operation from focus detecting to in-focus driving will be referred to as an AF operation.

More specifically, an in-focus position is calculated from an image shift amount between two images formed by object light fluxes that pass two different areas that held the optical axis of the image pickup lens 3. The light fluxes of these two images pass the main mirror 4, are reflected by the sub-mirror 7, and are guided to the AF sensor 8. The MPU 20 reads out signals of these two images, calculated the image shift amount by performing a correlative operation for these signals, and converts the image shift amount into a defocus amount for each focus detecting point.

Reference numeral 25 denotes a photometric circuit configured to output a brightness signal from each area of the AE sensor 13 to the MPU 20. The MPU performs an analog-todigital conversion for the brightness signal into photometric information of the object, calculates and sets image pickup exposure using the photometric information. A series of operations from obtaining this photometric information to setting image pickup exposure will be referred to as an AE operation hereinafter.

Reference numeral 26 denotes a motor driving circuit configured to control a motor (not illustrated) for driving the main mirror 4 and a motor (not illustrated) for charging the shutter 5. Reference numeral 27 denotes a shutter driving circuit configured to control power supply to a coil (not illustrated) for opening and closing the shutter 5. Reference numeral denotes a DC/DC converter configured to convert a voltage of the power source 29 into a voltage necessary for each circuit.

Reference numeral 30 denotes a release button configured to output signals of SW1 and SW2 to the MPU 20. SW1 is a switch configured to turn on by a first stroke (half-pressing) and to start the photometry and the AF operation. SW2 is a switch configured to turn on by a second stroke (full pressing) and to start the exposure operation.

Reference numeral 31 denotes a mode button. When an electronic dial 32 and the MC 33 are operated after the mode button is operated, a variety of types of modes are changed in accordance with the input. When the button is again operated, the mode is set. These modes include an automatic setting mode of a correcting value, which will be described later with reference to FIG. 8, and a learning function setting mode, which will be described later with reference to FIG. 9.

Reference numeral 32 denotes an electronic dial configured to output an ON signal in accordance with the dial's rotating clicks to an up/down counter (not illustrated) in the MPU 20, and the number is counted. In accordance with the counted value, a variety of types of numerical values, data, etc. are selected.

Reference numeral 33 denotes a multi-controller ("MC") that serves as an input unit used to select and set an AF frame (focus detecting frame) and a variety of types and modes displayed on the liquid crystal monitor 14 at the live view time. The MC 33 allows inputs in such eight directions as up and down, left and right, up and to the right, down and to the right, up and to the left, and down and to the left, and an input by pressing.

The MC 33 serves as a mode setting unit configured to set a live view mode. The MC 33 also serves as a frame setting unit configured to set an AF frame that is a target of a focus detection, to an arbitrary position in the image pickup area of the image pickup element 6. In this embodiment, the AF frame is set to a size of 6 fields in the lateral direction and 6 fields in the longitudinal direction, and can be moved to an arbitrary position in the image pickup area in accordance with an input signal of the MC 33. In an example, the AF frame is moved every one field unit.

Reference numeral 34 denotes a power button configured to power on and off the camera when operated. Reference numeral 35 denotes a reproduction button, which enables, when operated, an image recorded in the media 48, which will be described later, to be displayed on the liquid crystal monitor 14.

Reference numeral 40 is a CDS (corrected double sampling)/AGC (automatic gain control) circuit for sample holding and automatic gain control of an image signal output from the image pickup element 6. Reference numeral 41 denotes an A/D converter configured to convert an analog output to a digital signal.

Reference numeral 42 denotes a TG (timing generator) configured to supply a driving signal to the image pickup element 6, a sample-holding signal to the CDS/AGC circuit 40, and a sample clock signal to the A/D converter 41.

Reference numeral 43 denotes an SDRAM (memory) configured to temporarily record an image etc. digitalized by the A/D converter 41. The SDRAM 43 can record output signals of focus detecting pixels of the entire region of the image pickup area of the image pickup element 6. Alternatively, the SDRAM 43 calculates and records a defocus amount by performing a phase difference AF for the entire region of the image pickup area of the image pickup element 6.

Reference numeral 44 denotes an image processing circuit configured to perform a Y/C (brightness signal/color difference signal separation, a white balance correction, and a γ correction for an image. Reference numeral 45 denotes an image compression/decompression circuit configured to compress an image in accordance with JPEG or another format or to decompress the compressed image. The memory controller 21 allows the image processing circuit 44 to process an image signal output from the image pickup element 6, and obtains photometric information of the object.

Reference numeral 46 denotes a D/A converter configured to convert an image into an analog signal so as to display on the liquid crystal display 14 an image recorded in the SDRAM 43 or the media 48, which will be described later. Reference numeral 47 denotes an I/F (interface) with the media 48 so as to store the image.

The image file has an application marker segment used to record Exif appendix information. The application marker segment has $0^{th}$ IFD used to record appendix information relating to a compressed (primary) image, Exif IFD used to record appendix information specific to Exif, and $1^{st}$ IFD used to record a thumbnail image.

Exif IFD has a value of Exif IFD ("VEIFD") that is actually used to record data, such as a defocus amount of each focus detecting area (focus detecting data) obtained by the image pickup plane phase difference AF. The defocus amount data starts with recording from an upper left focus detecting area (field) on an image pickup plane and ends with recording to a lower right focus detecting area on the image pickup plane. When recording of the column in the horizontal direction ends, a field of the next row in the perpendicular direction starts.

Raw image data is referred to as an image file of a RAW data format before an image signal output from the image pickup element 6 and digitalized by the A/D converter 41 receives a variety of types of processing including a Y/C (brightness signal/color difference signal separation, a white balance correction, a γ correction, and a compression process.

The image file in the RAW data format has fields for image appendix information recordable a variety of types of information in accordance with a tag format of the Exif format, thumbnail data, and RAW data holding output data for each focus detecting pixel. The image appendix information holds positional information of the focus detecting pixels indicative of where the focus detecting pixels are arranged in the image pickup element 6.

First Embodiment

Figure 4:
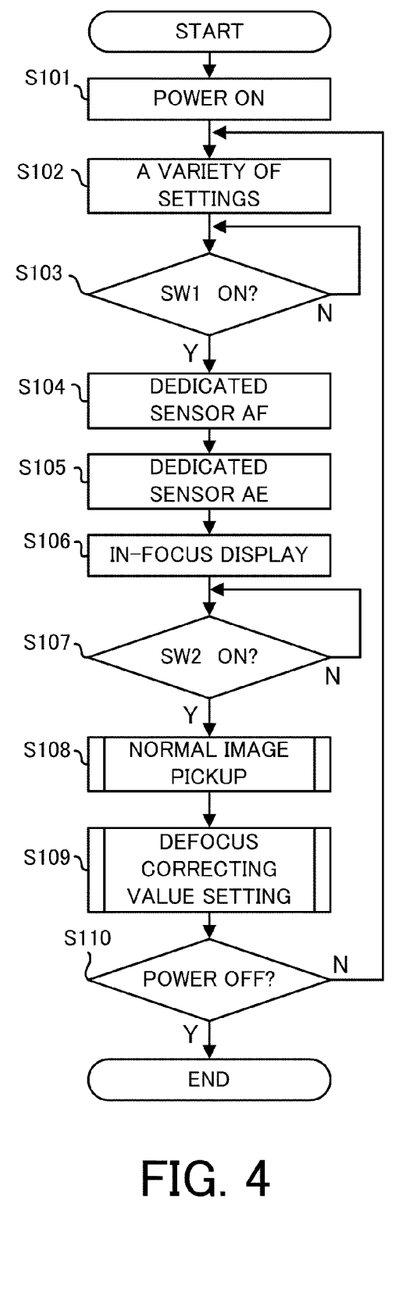
FIG. 4 is a flowchart for explaining an operation of the digital single-lens reflex camera illustrated in FIG. 1.

FIG. 4 illustrates an operational flow of the MPU 20 of the digital single-lens reflex camera, and "S" in FIG. 4 and subsequent figures stands for the step.

Initially, when the power button 34 becomes turned on, the MPU 20 confirms operations of each actuator and the image pickup element 6 (S101), detects initialization states of the memory contents and execution programs, and executes an image pickup preparation operation. Next, the MPU 20 performs a variety of types of settings (such as an image pickup mode and a shutter speed) of the camera in response to a variety of types of button operations (S102).

Next, the MPU 20 waits for turning on of SW1 (S103), and performs a phase difference AF using the AF sensor (dedicated sensor) 8 when determining that SW1 has been turned on (S104). Next, the MPU 20 performs an AE operation using the AE sensor 13 (S105), and displays a position of the focus detecting point that is focused on the viewfinder (S106).

Figure 5:
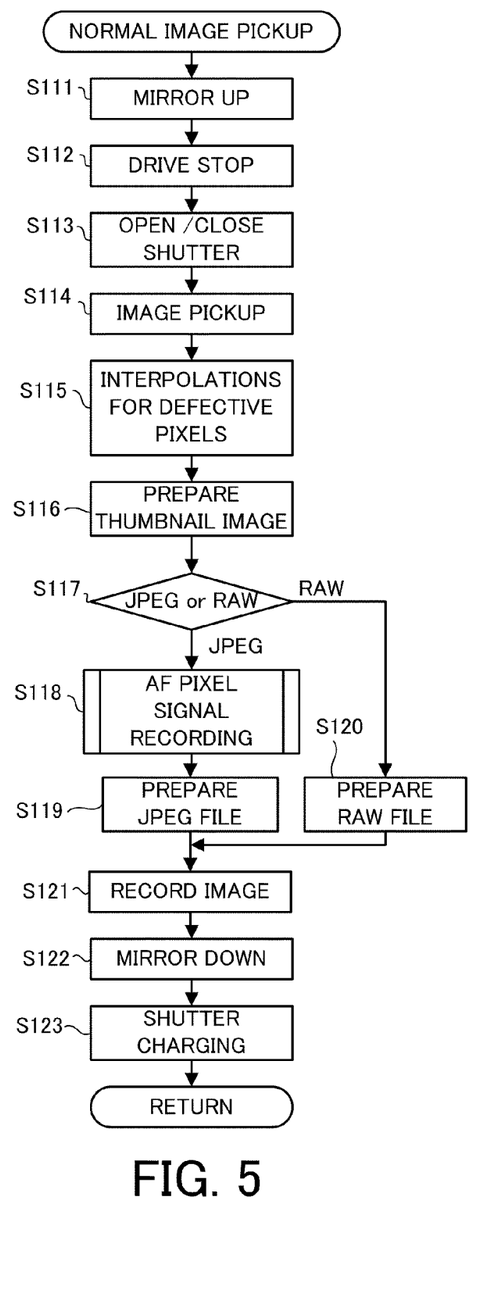
FIG. 5 is a flowchart for explaining a normal image pickup routine illustrated in FIG. 4.

Next, the MPU 20 waits for turning on SW2 (S107), and performs normal image pickup when determining that SW2 has been turned on (S108). FIG. 5 is a normal image pickup routine.

Initially, the MPU 20 controls a mirror driving motor (not illustrated) through the motor driving circuit 26, and retreats (or moves up) the main mirror 4 and the sub-mirror 7 from the image pickup optical path, as illustrated in FIG. 2 (S111).

Next, the MPU 20 allows the lens control circuit 23 to drive the stop (not illustrated) in the image pickup lens 3 in accordance with the image pickup exposure calculated based on the AE result (S112), and allows the shutter driving circuit 27 to open and close the shutter 5 (S113).

Next, the MPU 20 allows the memory controller to read out and temporarily store in the SDRAM 43 the image signal derived from the light received by the image pickup element 6 (S114). This temporarily stored data is the image pickup data.

Next, the MPU 20 interpolates the defective pixels of the image signal read out by the memory controller 21 (S115). Since the focus detecting pixels have no RGB color information and correspond to defective pixels, the image signal is generated through interpolations using information of the surrounding image pickup pixels. A defective-pixels interpolated image is made by interpolating the defective pixels from the generated image signal and the original image signal, and temporarily stored in the SDRAM 43.

Next, the MPU 20 allows the memory controller 21 to prepare a thumbnail image based on the defective-pixels interpolated image and to temporarily store it in the SDRAM 43 (S116). Next, the MPU 20 determines which of JPEG and RAW is selected for the recorded image quality of the captured image (S117), and executes the focus detecting pixel (AF pixel) signal recording routine (S118) when JPEG is selected.

Figure 6:
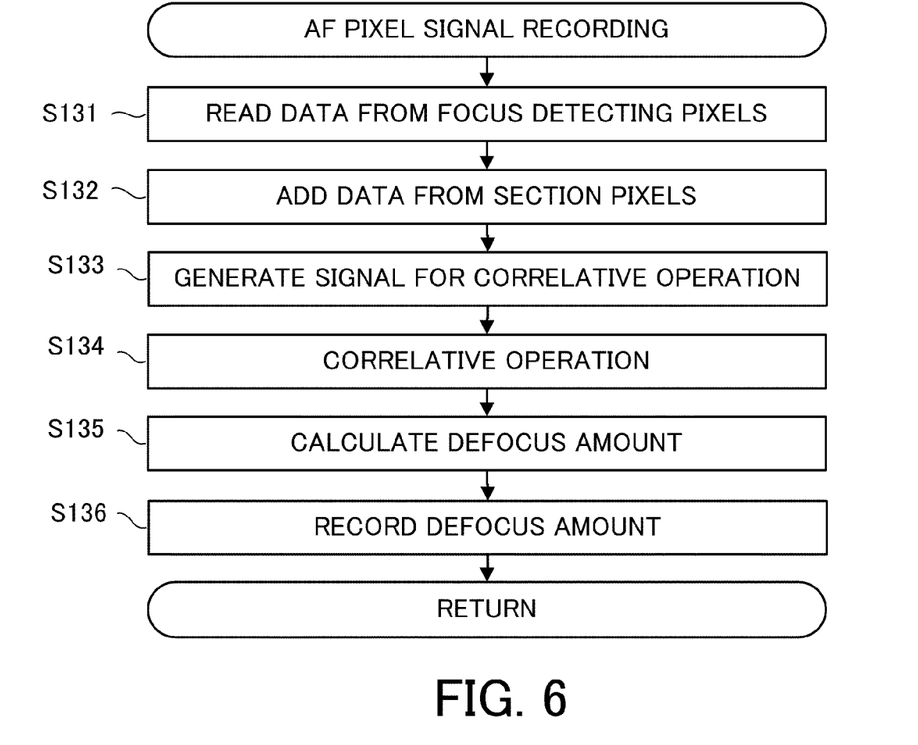
FIG. 6 is a flowchart for explaining a signal recording routine from focus detecting pixels illustrated in FIG. 5.

FIG. 6 is an AF pixel signal recording routine of S118.

Initially, the MPU 20 reads out each focus detecting pixel contained in each focus detecting area using the image signal temporarily stored in SDRAM 43 and the memory controller 21 (S131). Next, the MPU 20 allows the memory controller 21 to add the focus detecting pixels in each section, and obtains the AF pixel signal of each section (S132).

Next, the MPU 20 generates signals of two images for correlative operation based on the AF pixel signal, for each focus detecting area (S133). The focus detecting area is the same area as one field, and 1350 pairs of signals are generated for the entire image pickup area in this embodiment.

Next, the MPU 20 performs a correlative operation for the obtained two images, and calculates a relative positional shift amount between the two images (S134). Next, the MPU 20 operates a defocus amount (S135). Next, the MPU 20 allows the memory controller 21 to temporarily store the operated defocus amount in the SDRAM 43 (S136). The defocus amount has data of 1350 focus detecting areas.

Turning back to FIG. 5, the MPU 20 allows the image processing circuit 44 to perform image processing, such as a white balance correction, a γ correction, and an edge enhancement, for the defective-pixels interpolated image, and allows the image compression/decompression circuit 45 to compress the resultant image in accordance with the JPEG format.

In addition, the MPU 20 allows the memory controller 21 to record the data in the image compression data unit. Moreover, the MPU 20 stores a thumbnail image in the $1^{st}$ IFD and defocus amount data in the VEIFD. Furthermore, the MPU 20 stores a variety of types of settings of the camera (such as a shutter speed, an aperture value, and a lens focal length) in accordance with the Exif rule, and prepares JPEG files of an image and a variety of types of data.

On the other hand, when the MPU 20 determines that RAW is selected (S117), the MPU 20 allows the memory controller 21 to record in the RAW data the image signal temporarily stored in the SDRAM 43. In addition, the MPU 20 records the positional information of the focus detecting pixels and a variety of types of setting of the camera in the image appendix information and the thumbnail image in the thumbnail data, thereby making RAW files of an image and a variety of types of data (S120).

Next, the MPU 20 records the JPEG or RAW image file in the media 48 (S121). Next, the MPU 20 controls a mirror driving motor (not illustrated) via the motor driving circuit 26, and moves down the main mirror 4 and the sub-mirror 7 that have been retreated from the image pickup optical path to observation positions to reflect and guide the image pickup light flux to the viewfinder (S122). Next, the MPU 20 controls electrifications to the charging motor (not illustrated) through the motor driving circuit 26, and charges the shutter 5 (S123).

Next, turning back to FIG. 4, the MPU 20 executes the defocus correcting value setting routine (S109).

Figure 7:
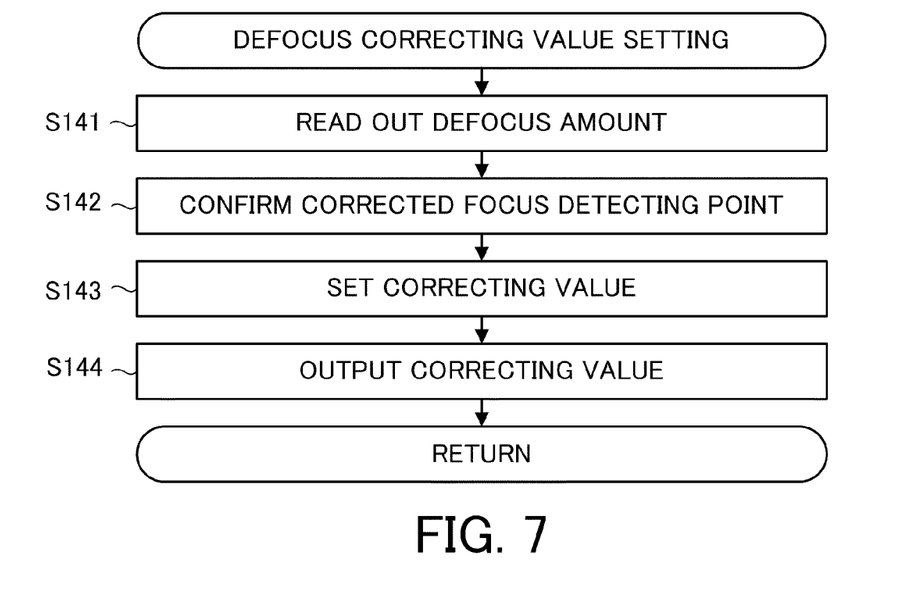
FIG. 7 is a flowchart for explaining a defocus correcting value setting routine illustrated in FIG. 4 according to a first embodiment.

FIG. 7 illustrates a flow of a defocus correcting value setting routine of S109.

Initially, the MPU 20 reads out a defocus amount of each focus detecting point from the image signal temporarily recorded in the SDRAM 43 through the memory controller 21 (S141). In addition, the MPU 20 confirms the focus detecting point for which the in-focus operation to be corrected is performed by the memory controller 21 (S142).

Next, the MPU 20 sets a correcting value for lowering or removing a defocus amount of the focus detecting point of S142 in the EEPROM 22 (S143). Next, the MPU 20 sends the correcting value to the lens control circuit 23 so that the correcting value can be reflected for the next lens driving control and used for in-focus driving of the focus lens unit of the image pickup lens 3 (S144).

Next, turning back to FIG. 4, the MPU 20 determines whether the camera is powered off by the OFF manipulation of the power button 34. When the camera is not powered off, the MPU 20 returns the flow to S102. When the camera is powered off, the MPU 20 ends the operation (S110).

In this embodiment, after a defocus amount is detected using the AF sensor 8 (S104), a defocus amount of the focus detecting point read out of the actually captured image signal (captured image) is calculated, and the defocus amount using the AF sensor is corrected based on the read data.

Only focusing using the AF sensor 8 may cause defocus due to the scattering secondary imaging focus detecting precision and scattering driving precision (such as stopping precision) of the image pickup lens at the focusing time. This embodiment can precisely set a correcting value of a defocus amount, and reflect a correcting value in the next lens driving control. As a result, the in-focus precision of the phase difference AF on the secondary imaging plane can be improved.

While the image pickup plane phase difference AF data recorded in the JPEG file is a defocus amount of each focus detecting area in this embodiment, a defocus-amount calculating range is not limited to the focus detecting area and may be set every section. The image pickup plane phase difference AF data is not limited to the defocus amount but may be distance measurement data, such as a distance from the camera to an object which is calculated based on the information of the image pickup lens 3 and the defocus amount. In addition, since the focus detecting pixel data is recorded in the RAW data, the image pickup plane phase difference AF data is not recorded in the image appendix information but may be recorded similar to the JPEG file.

Second Embodiment

Figure 8:
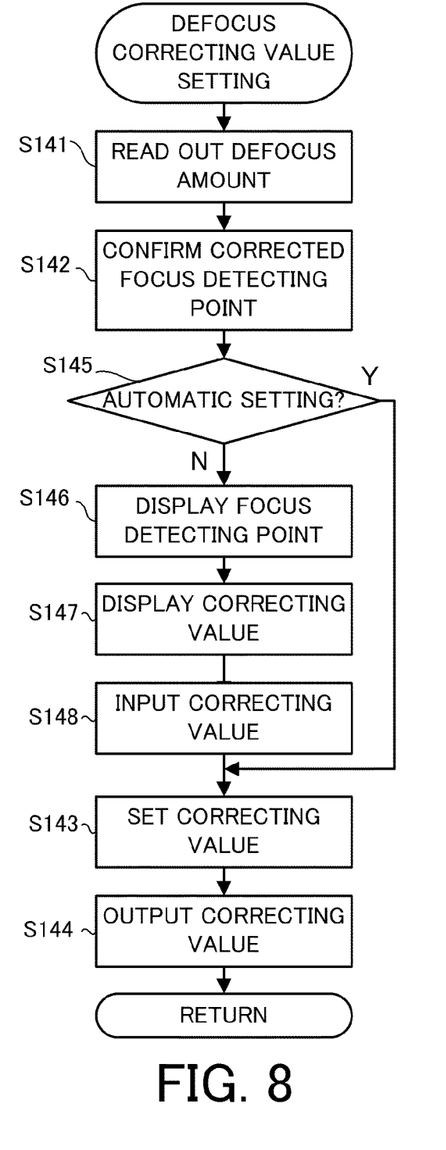
FIG. 8 is a flowchart for explaining a defocus correcting value setting routine illustrated in FIG. 4 according to a second embodiment.

This embodiment uses a defocus correcting value setting routine illustrated in FIG. 8 instead of that illustrated in FIGS. 7. S141 and S142 are similar to those illustrated in FIG. 7, and the MPU 20 determines whether the defocus correction is automatically set after S142 (S145).

When the defocus correction is not automatically set (N of S145), a manual correction-value input mode is set. The MPU 20 displays the focus detecting points confirmed in S142 (S146), displays a correcting value obtained in S141 (S147), and allows a photographer to input the correcting value (S148).

After S148 or when the MPU 20 determines that defocus correction is automatically set (Y of S145), the MPU 20 performs S143 and S144 illustrated in FIG. 7, and thereafter moves to S110 illustrated in FIG. 4.

This embodiment enables a photographer to manually input a correcting value in S146 to S148. Therefore, this embodiment can improve the in-focus precision by setting a correcting value individually suitable for the in-focus state which is considered appropriate by the photographer.

Third Embodiment

Figure 9:
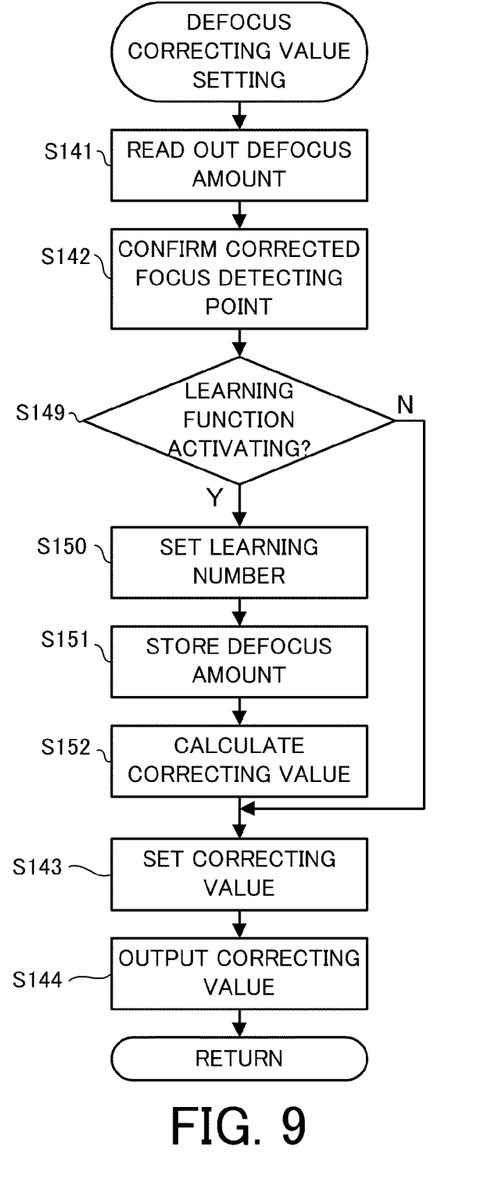
FIG. 9 is a flowchart for explaining a defocus correcting value setting routine illustrated in FIG. 4 according to a third embodiment.

This embodiment uses a defocus correcting value setting routine illustrated in FIG. 9 instead of that illustrated in FIGS. 7. S141 and S142 are similar to those steps illustrated in FIG. 7, and the MPU 20 determines whether a learning function is set after S142 (S149).

When the learning function is set (Y of S149), a correcting value input mode using the learning function is set and the MPU 20 sets the learning number (S150). When the learning number N is set, the MPU 20 learns defocus amounts N times. When N defocus amounts are learned, the learning number is reset. The post-reset number starts with "once." When the learning number is set to "0 times," the defocus amounts are continuously learned.

Next, the MPU 20 stores the set number of defocus amounts (S151), and then resets the stored defocus amount. When the number is reset and the learning number is set to "0 times," the defocus amounts are continuously stored. In this case, an upper limit of the storing number of the defocus amount may be set in accordance with the storage capacity of the SDRAM 43.

Next, the MPU 20 calculates a correcting value of the defocus data through averaging (S152). For example, when the learning number is set to three times, rather than calculating a correcting value after the defocus amount data is stored three times, a correcting value is obtained at the first time, calculated based on an average of the two defocus amounts at the second time, and calculated based on an average of the three defocus amounts at the third time. Even when the learning number is reset, the calculated correcting value is preserved. In addition, a plurality of correcting values may be held.

When the learning number is set to "0 times," the defocus amount data are continuously stored in S151 and the correcting values are continuously calculated in S152. In this case, a correcting value may be calculated after an upper limit of the storing number of defocus amounts is set in accordance with the storage capacity of the SDRAM 43.

After S152 or when the MPU 20 determines that the learning function is not automatically set (N of S149), the MPU 20 performs S143 and S144 illustrated in FIG. 7 and thereafter moves to S110 illustrated in FIG. 4.

This embodiment calculates a correcting value based on an average of a plurality of defocus amounts through S150 to S152, is unlikely to set a correcting value that happens to contain a large error, and improves the in-focus precision.

Fourth Embodiment

Figure 10:
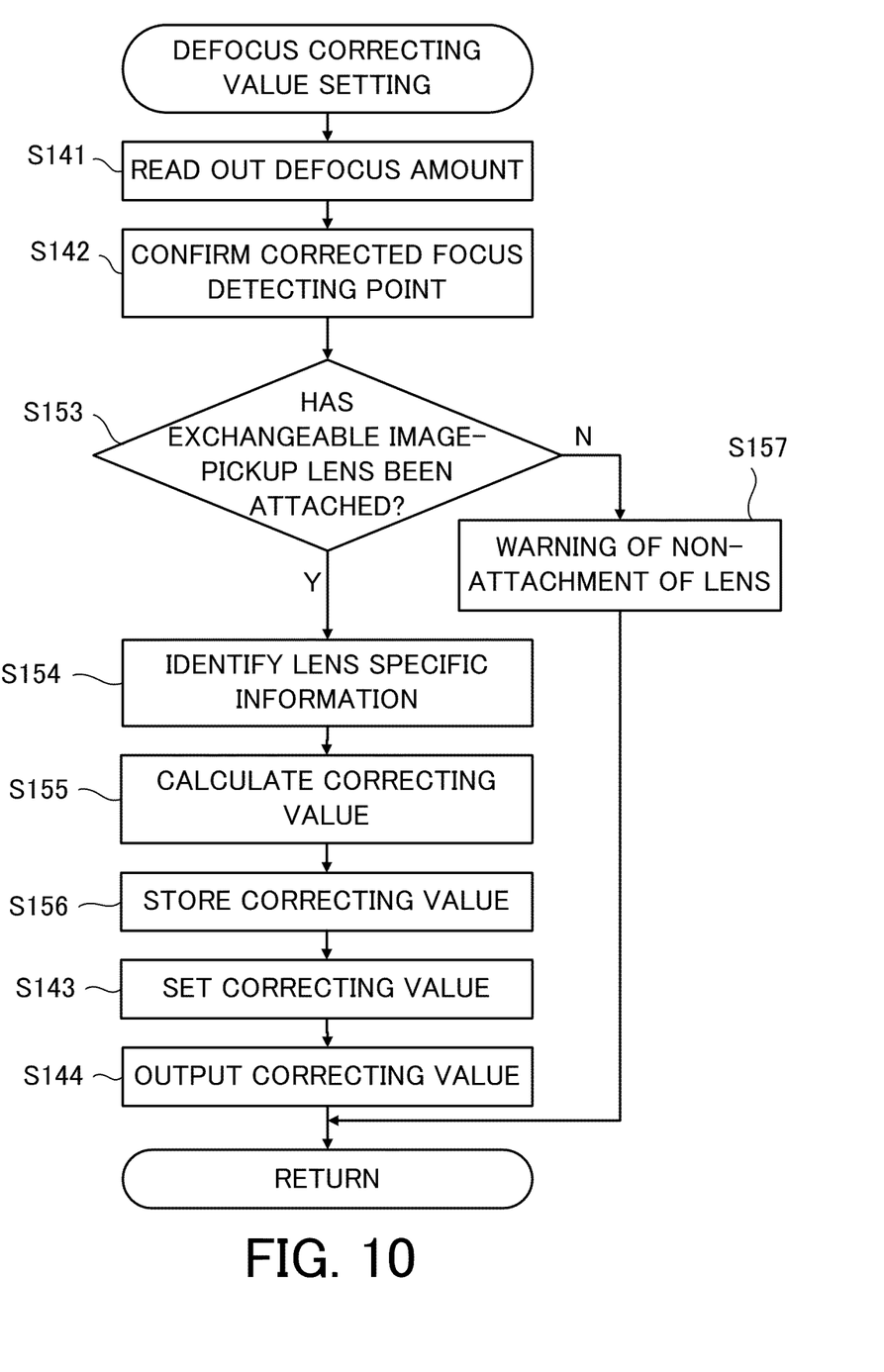
FIG. 10 is a flowchart for explaining a defocus correcting value setting routine illustrated in FIG. 4 according to a fourth embodiment.

This embodiment uses a defocus correcting value setting routine illustrated in FIG. 10 instead of that illustrated in FIGS. 7. S141 and S142 are similar to those illustrated in FIG. 7, and the MPU 20 determines whether an exchange lens is attached after S142 (S153).

When the MPU 20 determines that the exchange lens has been attached (Y of S153), the MPU 20 identifies lens specific information of the exchange lens (S154). The lens specific information contains a lens ID used to identify a lens type, a lens open F value, etc., and the lens control circuit 23 and the MPU 20 can identify the lens specific information by communicating with the image pickup lens 3.

Next, the MPU 20 calculates a correcting value of the defocus amount (S155), and stores a correcting value for lens specific information in the EEPROM 22 (S156). Thereafter, the MPU 20 performs 5143 and 5144 illustrated in FIG. 7, and thereafter moves to 5110 illustrated in FIG. 4.

On the other hand, when the MPU 20 determines that the exchange lens is not attached (N of S153), the MPU 20 warns the photographer of the non-attachment of the lens (S157) and thereafter moves to S110 of FIG. 4.

According to this embodiment, the MPU 20 sets a correcting value for the lens specific information, and can improve the in-focus precision without using an erroneous correcting value for the image pickup lens.

Fifth Embodiment

Figure 11:
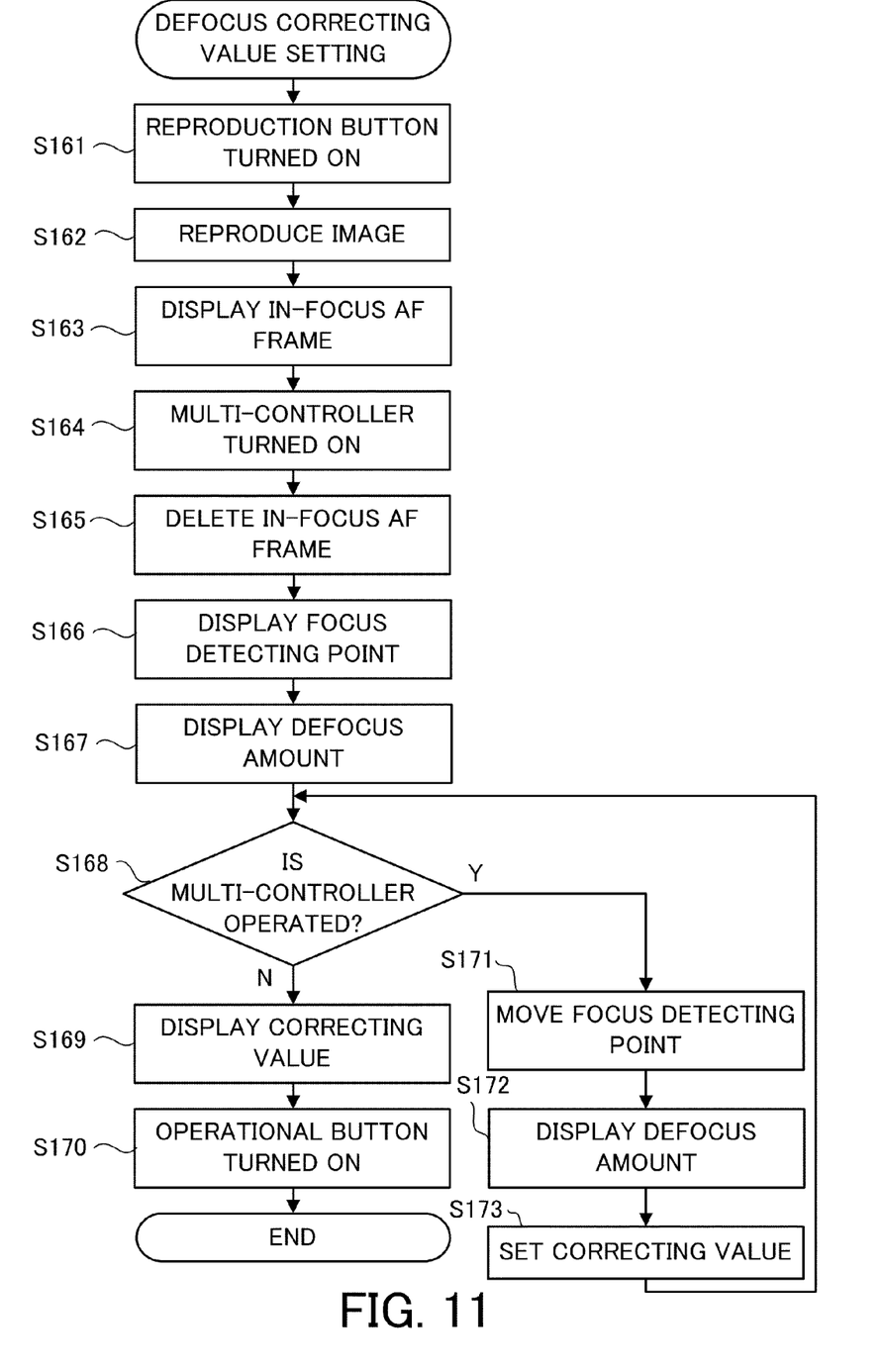
FIG. 11 is a flowchart for explaining a defocus correcting value setting routine illustrated in FIG. 4 according to a fifth embodiment.

This embodiment uses a defocus correcting value setting routine illustrated in FIG. 11 instead of that illustrated in FIG. 7.

Initially, the MPU 20 detects that the camera is switched from the image pickup mode to the image reproducing mode after the reproduction button 35 is turned on (S161), and allows the memory controller 21 to display on the liquid crystal monitor 14 an image file (captured image) recorded in the media 48 (S162). Here, an image file is recorded as a JPEG file in the media 48.

Next, the MPU 20 superimposes the AF frame on the captured image, which was used for the focus detection by the AF sensor 8 at the image pickup time (S163). The positional information of the AF frame is recorded in the VEIFD, and read out by the memory controller 21.

Next, the MPU 20 displays defocus information in response to pressing of the MC (S164), and deletes the AF frame from the liquid crystal monitor 14 (S165).

Next, the MPU 20 displays a focus detecting point (or area) (S166). Since each focus detecting area corresponds to one field area and a defocus amount for each field is recorded in a JPEG file in this embodiment, a focus detecting point is displayed on the liquid display monitor 14 every one field. An initially displayed position of the focus detecting point is a position having the smallest defocus amount.

Figure 12:
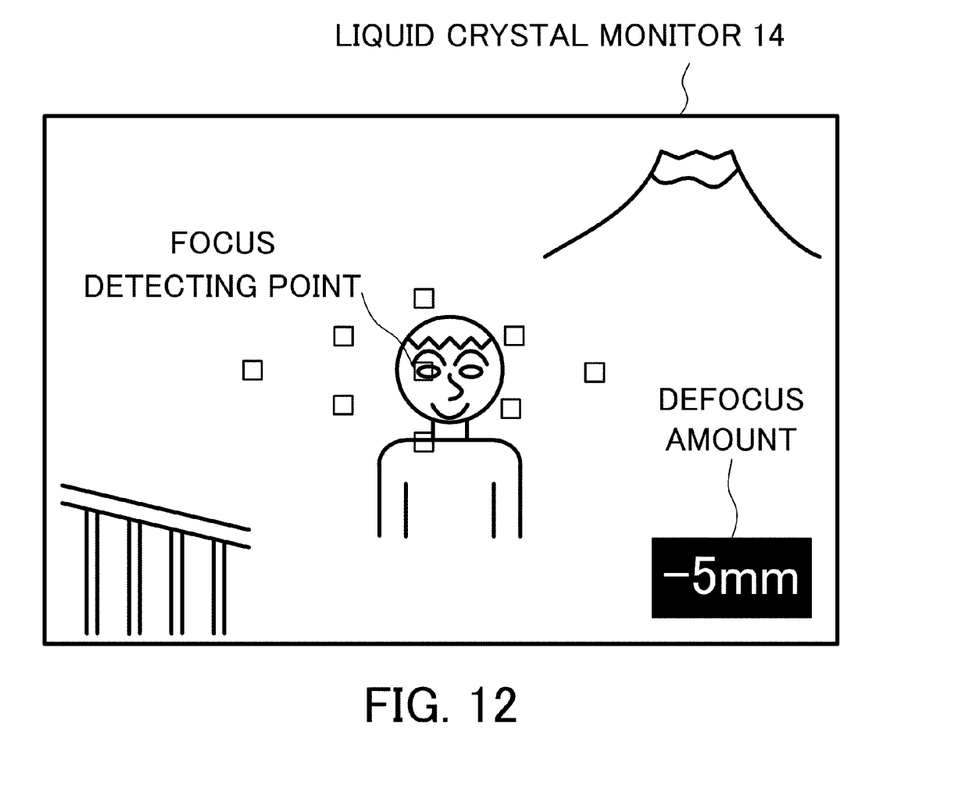
FIG. 12 is a diagram of a liquid crystal monitor illustrating a state of S167 illustrated in FIG. 11.

Next, the MPU 20 allows the memory controller 21 to read out a defocus amount at a position of the focus detecting point from the data recording area in the JPEG file, and to display it on the liquid crystal monitor 14 (S167). FIG. 12 illustrates this state, where a defocus amount of the focus detecting point is displayed as "−5 mm" at the lower right portion of the liquid crystal monitor 14.

Next, the MPU 20 determines whether an input in one of the eight directions is made using the MC 33 (S168).

When the MPU 20 determines that the MC 33 has been operated (Y of S168), the MPU 20 moves the focus detecting point in accordance with the manipulation of the MC 33 (S171). Therefore, the MC 33 serves as a selector configured to select a second focus detecting point different from the first focus detecting point.

Next, the MPU 20 allows the memory controller 21 to read out a defocus amount at a position of the moved focus detecting point from the data recording area in the JPEG file, and to display it instead of the pre-movement defocus amount (S172).

Next, the MPU 20 sets a correcting value used to reduce or remove a defocus amount (S173). The correcting value is set so as to correct the defocus amount by pressing the MC 33 when the MPU 20 moves the focus detecting point in accordance with a manipulation of the MC 33 and displays the defocus amount of the focus detecting point. When the MC 33 is operated in the up-and-down direction in this state, a defocus amount can be increased or decreased. A correcting value having a changed value for the defocus amount is set by again pressing the MC 33 after the correcting value is increased or decreased.

On the other hand, when the MPU 20 determines that the MC 33 is not manipulated (N of S168), the MPU 20 displays the correcting value of the defocus amount on the liquid crystal monitor 14 (S169). Next, the MPU 20 determines that an operational button, such as the release button 30 and the power button 34, which is not used in the reproduction mode is operated (S170), the MPU 20 ends the reproduction mode.

According to this embodiment, a photographer can confirm image pickup plane phase difference AF data at an arbitrary position in the captured image recorded in the image file when the image is reproduced. In addition, the photographer can change a position of the focus detecting point, obtain a defocus amount at that position, and set a correcting value. Therefore, the photographer can set a correcting value suitable for a focus detecting point which the photographer would like to stress, and improve the correcting value. An MC 33 operating method for changing a value of a defocus amount is not limited.

Sixth Embodiment

Figure 13:
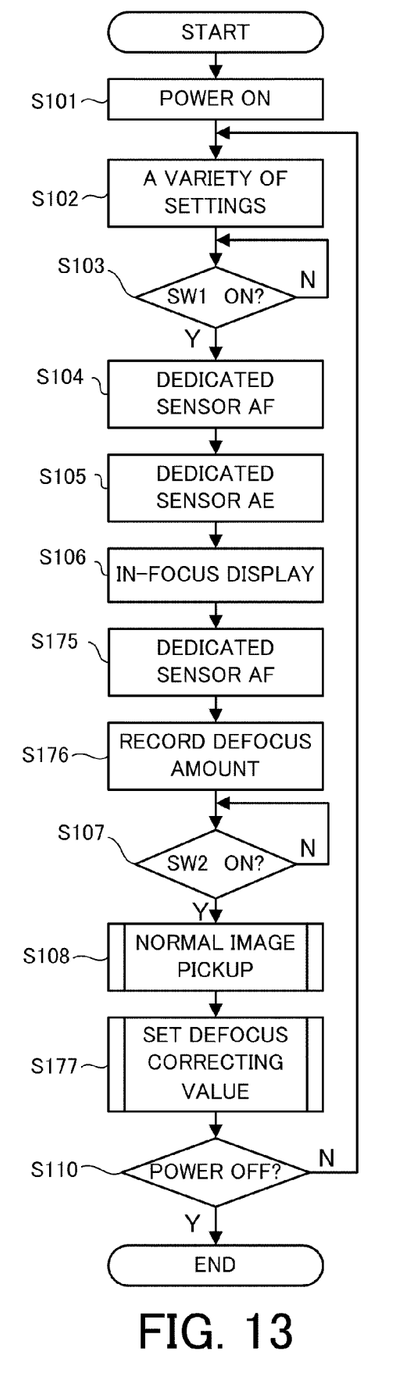
FIG. 13 is a flowchart for explaining an operation of a digital single-lens reflex camera according to a sixth embodiment.

This embodiment uses FIG. 15 instead of FIG. 4. In FIG. 13, the flow from S101 to S106 is similar to that of FIG. 4, and the MPU 20 again detects a defocus amount using the AF sensor 8 after S106 (S175).

Next, the MPU 20 records a defocus amount for each focus detecting point in the memory controller 21 (S176). The MPU 20 performs S107 and S108 after S176, and then executes a defocus correcting value setting routine (S177).

Figure 14:
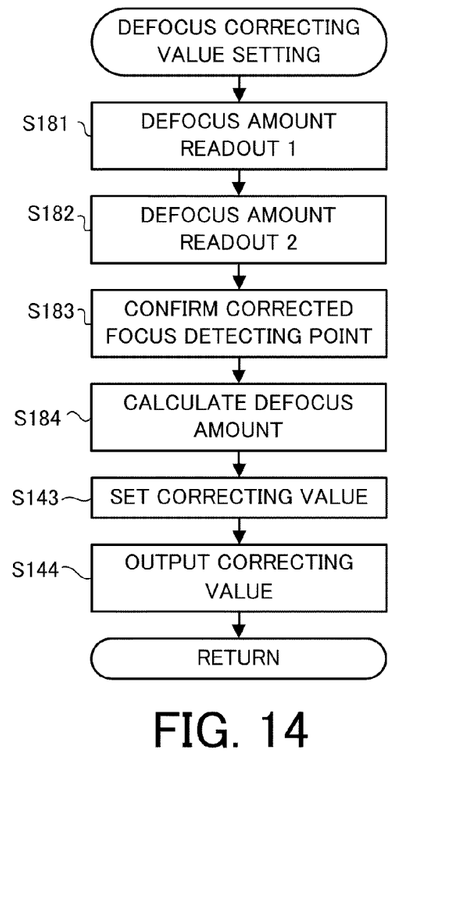
FIG. 14 is a flowchart for explaining a defocus correcting value setting routine of S177 illustrated in FIG. 13.

FIG. 14 is a flow of a defocus correcting value setting routine of S177.

Initially, the MPU 20 allows the memory controller 21 to read out the defocus amount obtained in S175 (S181). Next, the MPU 20 allows the memory controller 21 to read out a defocus amount included in each focus detecting area (S182).

Next, the MPU 20 allows the memory controller 21 to confirm the focus detecting point with which the in-focus action has been performed (S183).

Next, the MPU 20 calculates a defocus amount based on a difference between the defocus amount of S181 and the defocus amount of S182 (S184). This operation calculates a difference between a defocus amount obtained by the focus detection using the secondary imaging phase difference and the AF sensor 8 and a defocus amount obtained from the actually captured image signal.

Next, the S143 and S144 are performed, and the flow is then moved to S110 of S13.

This embodiment is different from FIG. 4 in that the focus detection using the AF sensor 8 is again performed in S175 so as to detect a precise focus state of the secondary imaging focus detection when the AF operation ends.

Only focusing of S104 may cause defocus due to the scattering secondary imaging focus detecting precision and the scattering driving precision of the image pickup lens at the focusing time. This embodiment can precisely find a difference between the defocus amounts from the captured image and a correcting value of a defocus amount by again performing a focus detection using the AF sensor 8 in S175 so as to precisely detect the secondary imaging focus state. As a result, this embodiment can improve the in-focus precision.

Seventh Embodiment

Figure 15:
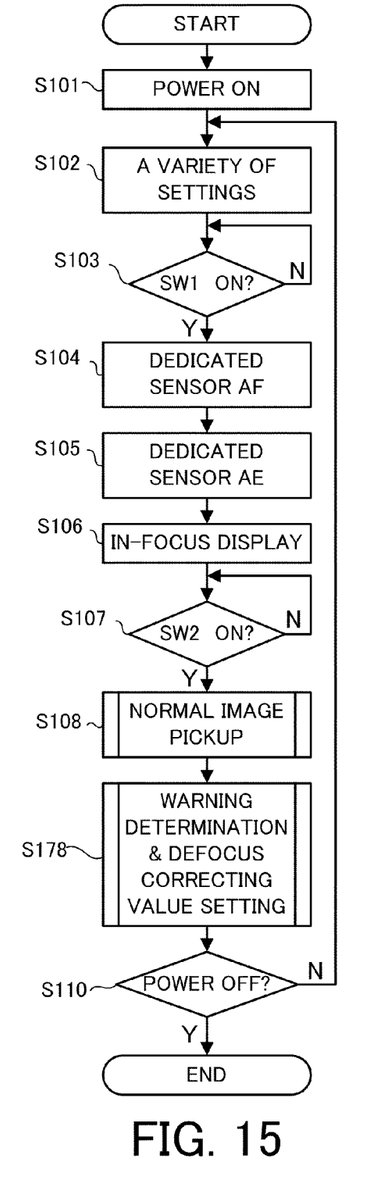
FIG. 15 is a flowchart for explaining an operation of a digital single-lens reflex camera according to a seventh embodiment.
Figure 16:
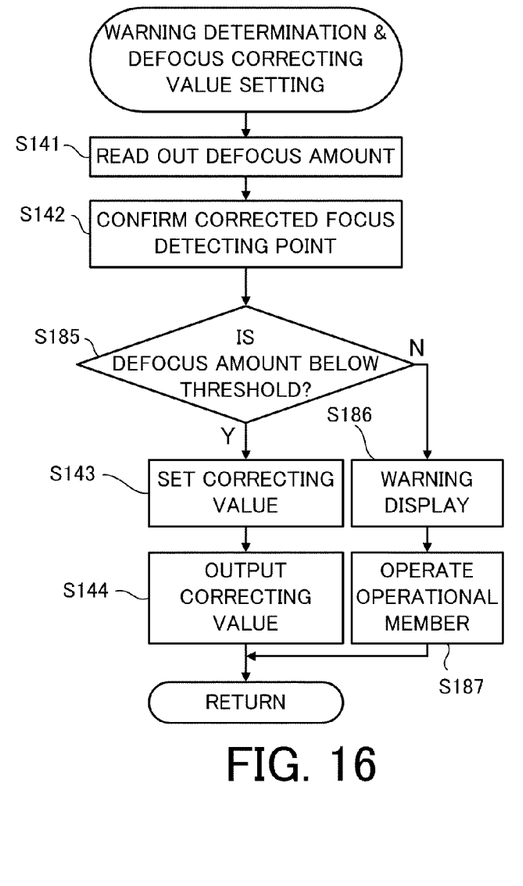
FIG. 16 is a flowchart for explaining a warning determining routine of S178 illustrated in FIG. 15.

This embodiment uses FIG. 15 instead of FIG. 4. FIG. 15 provides a warning determination routine (S178) instead of S109 illustrated in FIG. 4. FIG. 16 is a warning determination routine of S178, and the flow of S141 and S142 is similar to that illustrated in FIG. 7.

After S142, the MPU 20 determines whether the defocus amount of S142 falls within a threshold (S185). This threshold is set so as to secure a practically permissible range in which an image can be considered in focus, or a defocus range (threshold range) within a circle of confusion.

When the MPU 20 determines that the defocus amount is within the threshold (Y of S185), the MPU 20 performs S143 and S144 and moves the flow to S110 illustrated in FIG. 15.

Figure 17:
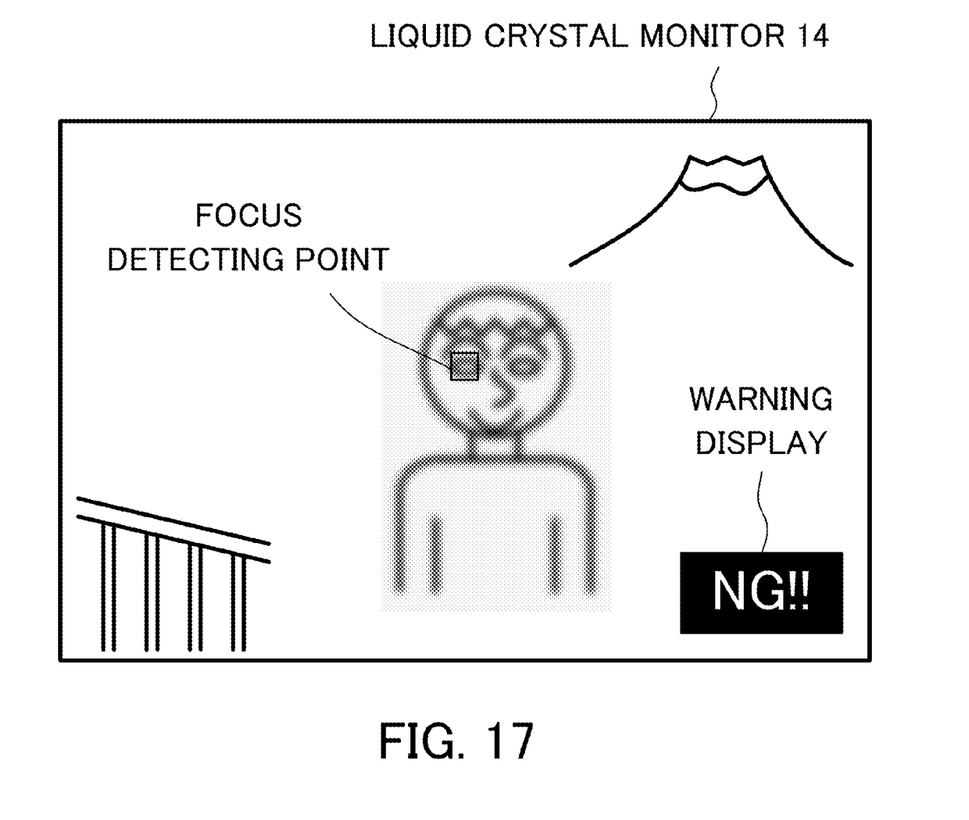
FIG. 17 is a diagram of a liquid crystal monitor illustrating a warning display of S186 illustrated in FIG. 16.

On the other hand, when the MPU 20 determines that the defocus amount is not within the threshold (N of S185), the MPU 20 provides a warning display on the liquid crystal monitor 14 so as to inform the photographer of a large defocus amount as illustrated in FIG. 17 (S186). In FIG. 17, the lower right portion of the liquid crystal monitor 14 illustrates that an image was taken when a defocus amount is larger than the threshold and the main object was out of focus.

The MPU 20 moves to S110 illustrated in FIG. 15 when any operational member is operated (S187).

This embodiment provides a warning display when a difference is equal to or larger than a threshold between a defocus amount obtained from the detection result of the AF sensor 8 and a defocus amount obtained from the detection result of the focus detecting pixels, and improves the in-focus precision by informing the photographer of defocus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-105596, filed Apr. 30, 2010 which is hereby incorporated by reference herein in its entirety.

What is claimed is:

1. An image pickup apparatus comprising:
a first image pickup element that includes a plurality of image pickup pixels each configured to generate an image of an object by performing a photoelectric conversion for light from an image pickup lens, wherein the first image pickup element is configured to be located on a secondary imaging plane;
a second image pickup element that includes a plurality of image pickup pixels each configured to generate an image of an object by performing a photoelectric conversion for light from an image pickup lens, wherein the second image pickup element is configured to be located on a primary imaging plane, wherein the second pickup element is configured to be able to output signal for recording image;

a first detector configured to detect a defocus amount related to a phase difference between two images of the object from the first image pickup element;

a second detector configured to detect a defocus amount based on a phase difference for two images of the object recorded from the second image pickup element; and a controller configured to provide focusing based on a defocus amount obtained from a detection result of the first detector, and set a correcting value used to correct a defocus amount obtained from a detection result of the first detector so that a difference can be reduced between the defocus amount obtained from the detection result of the first detector and a defocus amount obtained from the detection result of the second detector, wherein the correcting value is acquired from information according to the defocus amount detected by the second detector by using signal for recording image.

2. A focusing method used for an image pickup apparatus, the image pickup apparatus including a first image pickup element that includes a plurality of image pickup pixels each configured to generate an image of an object by performing a photoelectric conversion for light from an image pickup lens, wherein the first image pickup element is configured to be located on a secondary imaging plane, a second image pickup element that includes a plurality of image pickup pixels each configured to generate an image of an object by performing a photoelectric conversion for light from an image pickup lens, wherein the second image pickup element is configured to be located on a primary imaging plane, wherein the second pickup element is configured to be able to output signal for recording image, a first detector configured to detect a defocus amount related to a phase difference between two images of the object from the first image pickup element, and a second detector configured to detect a defocus amount based on a phase difference for two images of the object recorded from the second image pickup element, and the image pickup apparatus being configured to provide focusing based on a defocus amount obtained from a detection result of the first detector, said focusing method comprising setting a correcting value used to correct a defocus amount obtained from a detection result of the first detector so that a difference can be reduced between the defocus amount obtained from the detection result of the first detector and a defocus amount obtained from the detection result of the second detector wherein the correcting value is acquired from information according to the defocus amount detected by the second detector by using signal for recording image.

3. The image pickup apparatus according to claim 1, wherein the second image pickup element is configured to be able to output signal for live view image.

4. The image pickup apparatus according to claim 1, wherein the second image pickup element is configured to receive light that passes part of an exit pupil of the image pickup lens.

5. The image pickup apparatus according to claim 1, wherein the second detector is configured to detect a defocus amount related to a phase difference between two images of the object from the second image pickup element.

6. The image pickup apparatus according to claim 1, wherein the second image pickup element is configured to include focus detecting pixels for a first focus detecting point of a captured image of the object that has been captured.

7. The image pickup apparatus according to claim 1, the second image pickup element is an image pickup element that includes a plurality of image pickup pixels each configured to generate an image of an object by performing a photoelectric conversion for light from an image pickup lens, and a plurality of focus detecting pixels each configured to receive light that passes part of an exit pupil of the image pickup lens.

\* \* \* \* \*